US009905882B2

(12) United States Patent
Takase et al.

(10) Patent No.: US 9,905,882 B2
(45) Date of Patent: Feb. 27, 2018

(54) POSITIVE ACTIVE MATERIAL LAYER FOR RECHARGEABLE LITHIUM BATTERY, SEPARATOR FOR RECHARGEABLE LITHIUM BATTERY, AND RECHARGEABLE LITHIUM BATTERY INCLUDING AT LEAST ONE OF SAME

(71) Applicant: Samsung SDI Co., Ltd., Yongin-si, Gyeonggi-do (KR)

(72) Inventors: Hironari Takase, Yokohama (JP); Hokuto Yokotsuji, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 15/491,850

(22) Filed: Apr. 19, 2017

(65) Prior Publication Data

US 2017/0222256 A1 Aug. 3, 2017

Related U.S. Application Data

(62) Division of application No. 14/086,869, filed on Nov. 21, 2013, now Pat. No. 9,660,239.

(30) Foreign Application Priority Data

Nov. 22, 2012 (JP) .................................. 2012-256429
Aug. 23, 2013 (KR) ........................ 10-2013-0100539

(51) Int. Cl.
*H01M 10/0525* (2010.01)
*H01M 4/131* (2010.01)
*H01M 10/0569* (2010.01)
*H01M 2/16* (2006.01)
*H01M 4/525* (2010.01)
*H01M 4/505* (2010.01)
*H01M 4/583* (2010.01)
*H01M 4/02* (2006.01)

(52) U.S. Cl.
CPC ..... *H01M 10/0525* (2013.01); *H01M 2/1686* (2013.01); *H01M 4/131* (2013.01); *H01M 4/505* (2013.01); *H01M 4/525* (2013.01); *H01M 4/583* (2013.01); *H01M 10/0569* (2013.01); *H01M 2004/027* (2013.01); *H01M 2004/028* (2013.01); *H01M 2300/002* (2013.01); *H01M 2300/004* (2013.01); *H01M 2300/0034* (2013.01)

(58) Field of Classification Search
CPC ...... H01M 2/16; H01M 2/1673; H01M 4/131; H01M 4/505; H01M 4/525; H01M 10/0525
See application file for complete search history.

(56) References Cited

U.S. PATENT DOCUMENTS

| 5,436,090 | A | 7/1995 | Kono et al. | |
|---|---|---|---|---|
| 5,738,957 | A | 4/1998 | Amine et al. | |
| 5,759,717 | A | 6/1998 | Amine et al. | |
| 5,792,576 | A | 8/1998 | Xing et al. | |
| 6,660,432 | B2 | 12/2003 | Paulsen | |
| 8,568,922 | B1 | 10/2013 | Kim et al. | |
| 2002/0018935 | A1 | 2/2002 | Okada | |
| 2007/0160906 | A1 | 7/2007 | Tooyama | |
| 2007/0231702 | A1* | 10/2007 | Fujita | B60L 11/123 429/247 |
| 2010/0233547 | A1* | 9/2010 | Baba | H01M 2/166 429/246 |
| 2011/0250509 | A1 | 10/2011 | Yamaguchi et al. | |
| 2011/0262809 | A1* | 10/2011 | Kumagai | C01G 23/005 429/211 |
| 2012/0189912 | A1* | 7/2012 | Honda | H01M 4/667 429/211 |
| 2013/0089770 | A1* | 4/2013 | Nishikawa | H01M 2/162 429/145 |
| 2013/0089777 | A1 | 4/2013 | Tatsumi et al. | |
| 2013/0295449 | A1 | 11/2013 | Kobatake et al. | |
| 2014/0162141 | A1 | 6/2014 | Fujiki et al. | |

FOREIGN PATENT DOCUMENTS

| EP | 2 667 445 A1 | 11/2013 |
|---|---|---|
| JP | 3290229 B2 | 6/2002 |
| JP | 2002-302649 A1 | 10/2002 |
| JP | 2007-149535 A | 6/2007 |
| JP | 2007-519186 A | 7/2007 |
| JP | 2010-049928 A | 3/2010 |
| JP | 2011-171293 A | 9/2011 |
| JP | 2012-28311 A | 2/2012 |
| JP | 2012-064566 A | 3/2012 |

(Continued)

OTHER PUBLICATIONS

Machine translation of JP 2012-216419, published on Nov. 8, 2012.*
Henderson, Wesley, "Inexpensive, Nonfluorinated Anions for Lithium Salts and Ionic Liquids for Lithium Battery Electrolytes", *2010 U.S. Department of Energy Hydrogen Program and Vehicle Technologies Program, Annual Merit Review & Peer Evaluation Meeting*, Jun. 7-11, 2010, pp. 1-20.
Ohzuku et al., "An overview of positive-electrode materials for advanced lithium-ion batteries", *Journal of Power Sources*, vol. 174, No. 2, Dec. 6, 2007, pp. 449-456.
Extended European Search Report dated Feb. 19, 2014 for European Patent Application No. EP 13 193 829.2 which shares priority of Japanese Patent Application No. JP 2012-256429, filed Nov. 22, 2012, and Korean Patent Application No. KR 10-2013-0100539, filed Aug. 23, 2013, with captioned U.S. Appl. No. 14/086,869.

(Continued)

*Primary Examiner* — Anca Eoff
(74) *Attorney, Agent, or Firm* — Knobbe Martens Olson & Bear LLP

(57) ABSTRACT

A positive active material layer for a rechargeable lithium battery including a positive active material and a protection film-forming material is disclosed. A separator for a rechargeable lithium battery including a substrate and a porous layer positioned at least one side of the substrate and including a protection film-forming material is also disclosed. A rechargeable lithium battery can include at least one of the positive active material layer and the separator.

9 Claims, 6 Drawing Sheets

(56) References Cited

FOREIGN PATENT DOCUMENTS

| JP | 2012-089402 A | | 5/2012 |
|---|---|---|---|
| JP | 2012-216419 A | | 11/2012 |
| KR | 10-2011-0022633 A | | 3/2011 |
| KR | 10-2012-0046609 A | | 5/2012 |
| WO | WO 2011/049184 A1 | | 4/2011 |
| WO | WO 2011/092938 | * | 8/2011 |
| WO | WO 2011/162034 | | 12/2011 |
| WO | WO 2012/041434 A1 | | 4/2012 |
| WO | WO 2012/070154 A1 | | 5/2012 |
| WO | WO 2012-099259 A1 | | 7/2012 |
| WO | WO 2012/137375 | * | 10/2012 |

OTHER PUBLICATIONS

European Examination Report dated Mar. 2, 2015 for European Patent Application No. EP 13 193 829.2 which shares priority of Japanese Patent Application No. JP 2012-256429, filed Nov. 22, 2012, and Korean Application No. KR 10-2013-0100539, filed Aug. 23, 2013, with captioned U.S. Appl. No. 14/086,869.

European Examination Report dated Sep. 4, 2015 for European Patent Application No. EP 13 193 829.2 which shares priority of Japanese Patent Application No. JP 2012-256429, filed Nov. 22, 2012, and Korean Patent Application No. KR 10-2013-0100539, filed Aug. 23, 2013, with captioned U.S. Appl. No. 14/086,869.

First Chinese Office Action dated Sep. 5, 2016 for Chinese Patent Application No. CN 201310596243.1, which shares priority of Japanese Patent Application No. JP 2012-256429, filed Nov. 22, 2012; and Korean Patent Application No. KR 10-2013-0100539, filed Aug. 23, 2013, with subject U.S. Appl. No. 14/086,869.

Third Chinese Office Action dated Sep. 29, 2017 for Chinese Patent Application No. CN 201310596243.1, which shares priority of Japanese Patent Application No. JP 2012-256429 and Korean Patent Application No. KR 10-2013-0100539 with subject U.S. Appl. No. 15/491,850.

Korean Office Action dated Aug. 28, 2017 for Korean Patent Application No. KR 10-2013-0100539 from which subject U.S. Appl. No. 15/491,850 claims priority.

* cited by examiner

POSITIVE ACTIVE MATERIAL LAYER FOR RECHARGEABLE LITHIUM BATTERY, SEPARATOR FOR RECHARGEABLE LITHIUM BATTERY, AND RECHARGEABLE LITHIUM BATTERY INCLUDING AT LEAST ONE OF SAME

CROSS-REFERENCE TO RELATED APPLICATIONS

This application is a divisional of and claims priority to U.S. application Ser. No. 14/086,869 filed Nov. 21, 2013 which claims priority to and the benefit of Japanese Patent Application No. 2012-256429 filed in the Japanese Patent Office on Nov. 22, 2012, and Korean Patent Application No. 10-2013-0100539 filed in the Korean Intellectual Property Office on Aug. 23, 2013, the disclosures of which are incorporated herein by reference in their entirety.

BACKGROUND

Field

This invention relates to a rechargeable lithium battery having a positive active material layer, a separator, or both Description of the Related Technology A rechargeable lithium battery has higher energy density than a lead battery or a nickel cadmium battery and is widely used. However, the rechargeable lithium battery often has a short cycle-life.

Japanese Patent Publication No. 2011-171293 discloses a method of using a high dielectric solvent such as γ-butyrolactone, propylene carbonate, and the like, and simultaneously dissolving a lithium compound such as lithium tetracyanoborate (LiTCB) and the like in the high dielectric solvent. In other words, the lithium compound such as lithium tetracyanoborate (LiTCB) was used as an electrolyte for an electrolyte solution to improve cycle-life.

However, since the lithium compound is often present in a small amount, for example, 0.7 mol/L is dissolved in the high dielectric solvent, the battery cycle-life improvement, for example under a current density of 1 mA/cm$^2$, is insufficient. In addition, the high dielectric solvent may provide insufficient current density. In order to solve this problem, another method of dissolving the lithium compound in a low dielectric solvent such as diethyl carbonate instead of a high dielectric solvent has been considered, but the lithium compound is not soluble in the low dielectric solvent.

In addition, a rechargeable lithium battery has recently been used at an operation voltage of greater than or equal to about 4.3V, but a low operation voltage is needed in a rechargeable lithium battery based on the disclosure in the Japanese Patent Publication No. 2011-171293. This Japanese patent application discloses increasing the operation voltage of a rechargeable lithium battery by using an electrode with a low potential, for example, graphite as a negative electrode. However, the lithium compound is easily decomposed on the negative electrode.

Therefore, given the limited types of solvents and negative electrodes available, increasing the current density and the operation voltage of a rechargeable lithium battery has been difficult.

SUMMARY OF CERTAIN INVENTIVE ASPECTS

One aspect of the disclosed technology relates to a positive active material layer for a rechargeable lithium battery having excellent cycle-life characteristics at a high current density and a high voltage.

Another aspect of the disclosure relates to a separator for a rechargeable lithium battery having excellent cycle-life characteristics at a high current density and a high voltage.

An additional aspect of the disclosure relates to a rechargeable lithium battery including at least one of the positive active material layer and the separator.

One embodiment provides a positive active material layer for a rechargeable lithium battery including the positive active material; and at least one protection film-forming material out of lithium compounds represented by the following Chemical Formulae 4 to 6.

$$LiB(CN)_{4-n1}(X_1)_{n1} \qquad \text{Chemical Formula 4}$$

$$LiP(CN)_{6-n2}(X_2)_{n2} \qquad \text{Chemical Formula 5}$$

$$LiC(CN)_{3-n3}(X_3)_{n3} \qquad \text{Chemical Formula 6}$$

In the above Chemical Formulae 4 to 6, n1 is an integer ranging from 0 to 3, $n_2$ is an integer ranging from 0 to 5, $n_3$ is an integer ranging from 0 to 2, and $X_1$ to $X_3$ are independently a ligand, wherein the ligand can be selected from a halogen atom, a substituted or unsubstituted $C_1$-$C_{10}$ alkoxy group, a substituted or unsubstituted $C_1$-$C_4$ fluoroalkyl group, a linear carboxyl group, and a sulfonyl group.

In some embodiments, the positive active material may include at least one solid-solution oxide of compounds represented by the following Chemical Formulae 1 to 3.

$$Li_aMn_xCo_yNi_zO_2 \qquad \text{Chemical Formula 1}$$

In the above Chemical Formula 1, $1.150 \leq a \leq 1.430$, $0.45 \leq x \leq 0.6$, $0.10 \leq y \leq 0.15$, and $0.20 \leq z \leq 0.28$.

$$LiMn_xCo_yNi_zO_2 \qquad \text{Chemical Formula 2}$$

In the above Chemical Formula 2, $0.3 \leq x \leq 0.85$, $0.10 \leq y \leq 0.3$, and $0.10 \leq z \leq 0.3$.

$$LiMn_{1.5}Ni_{0.5}O_4 \qquad \text{Chemical Formula 3}$$

In some embodiments, the protection film-forming material may be included in an amount of about 0.1 wt % to about 6 wt % based on the total amount of the positive active material layer.

When the protection film-forming material is a lithium compound represented by the above Chemical Formula 4, the protection film-forming material may be included in an amount of about 0.5 wt % to about 6 wt % based on the total amount of the positive active material layer. In some embodiments, when the protection film-forming material is a lithium compound represented by the above Chemical Formula 5, the protection film-forming material may be included in an amount of about 0.3 wt % to about 2 wt % based on the total amount of the positive active material layer. In some embodiments, when the protection film-forming material is a lithium compound represented by the above Chemical Formula 6, the protection film-forming material may be included in an amount of about 0.5 wt % to about 3 wt % based on the total amount of the positive active material layer.

In some embodiments, a separator for a rechargeable lithium battery can include a substrate; and a porous layer positioned at least one side of the substrate, wherein the porous layer includes at least one protection film-forming material of lithium compounds represented by the above Chemical Formulae 4 to 6.

The protection film-forming material may be included in an amount of about 10 wt % to about 90 wt % based on the total amount of the porous layer.

In some embodiments, a rechargeable lithium battery can include a positive electrode including a current collector and positive active material layer disposed on the current collector and including a positive active material; a negative electrode; a separator including a substrate and a porous layer positioned at least one side of the substrate; and an electrolyte, wherein at least one of the positive active material layer and the porous layer includes at least one protection film-forming material of lithium compounds represented by the above Chemical Formulae 4 to 6.

The protection film-forming material is a material that forms a protection film at the interface between the positive active material layer and the porous layer, or a material that forms a protection film at an interface between the positive active material and the electrolyte solution.

In some embodiments, the protection film may include a polymer formed by polymerization of the protection film-forming material.

The electrolyte may include a lithium salt, solvent and an additive, and the additive may include a negative electrode-functioning compound, a positive-functioning compound, an ester-based compound, a carbonate ester-based compound, a sulfuric acid ester-based compound, a phosphoric acid ester-based compound, a boric acid ester-based compound, acid an anhydride-based compound, an electrolyte-based compound, or a combination thereof.

Other embodiments are included in the following detailed description.

A rechargeable lithium battery having excellent cycle-life characteristics at a high current density and a high voltage may be realized.

DETAILED DESCRIPTION OF CERTAIN INVENTIVE EMBODIMENTS

Hereinafter, embodiments are described in detail. However, these embodiments are exemplary, and this disclosure is not limited thereto.

Hereinafter, a rechargeable lithium battery according to one embodiment is described referring to FIG. 1.

As used herein, when specific definition is not otherwise provided, the term "substituted" refers to one substituted with a substituent selected from a halogen atom (F, Cl, Br, or I), a hydroxy group, a $C_1$ to $C_{20}$ alkoxy group, a nitro group, a cyano group, an amine group, an imino group, an azido group, an amidino group, a hydrazino group, a hydrazono group, carbonyl group, carbamyl group, a thiol group, an ester group, an ether group, a carboxyl group or a salt thereof, a sulfonic acid group or a salt thereof, a phosphoric acid group or a salt thereof, a $C_1$ to $C_{20}$ alkyl group, a $C_2$ to $C_{20}$ alkenyl group, a $C_2$ to $C_{20}$ alkynyl group, a $C_6$ to $C_{30}$ aryl group, a $C_3$ to $C_{20}$ cycloalkyl group, a $C_3$ to $C_{20}$ cycloalkenyl group, a $C_3$ to $C_{20}$ cycloalkynyl group, a $C_2$ to $C_{20}$ heterocycloalkyl group, a $C_2$ to $C_{20}$ heterocycloalkenyl group, a $C_2$ to $C_{20}$ heterocycloalkynyl group, or a combination thereof, instead of at least one hydrogen of a compound.

Figure 1:
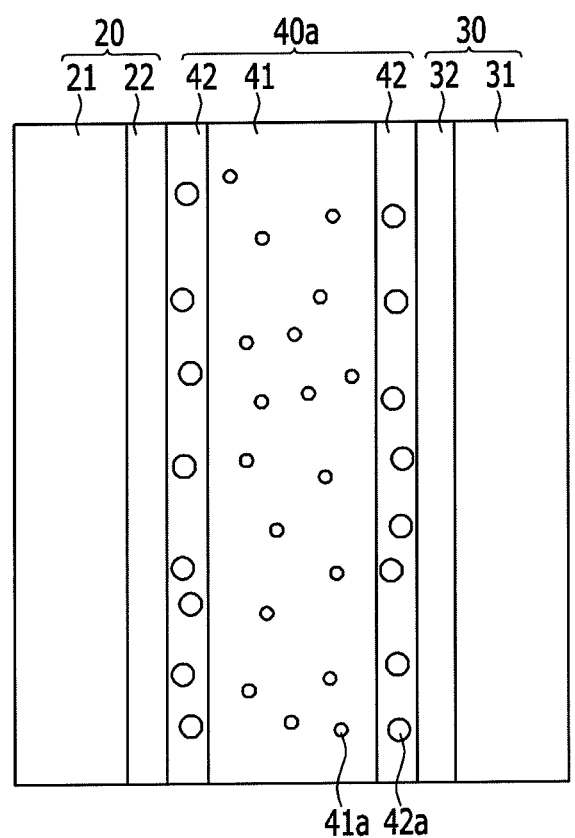
FIG. 1 is a cross-sectional view showing the schematic structure of a rechargeable lithium battery.

FIG. 1 is a cross-sectional view showing the schematic structure of a rechargeable lithium battery.

Referring to FIG. 1, a rechargeable lithium battery 10 includes a positive electrode 20, a negative electrode 30, and a separator layer 40. The separator layer 40 includes a separator 40a and an electrolyte 43. The positive electrode 20 includes a current collector 21 and a positive active material layer 22, and the separator 40a includes a substrate 41 and a porous layer 42 positioned on at least one side of the substrate 41.

In some embodiments, at least one of the positive active material layer 22 and the porous layer 42 may include a protection film-forming material. The protection film-forming material is described in the description of the positive active material layer 22 and the porous layer 42 that will follow in detail.

The rechargeable lithium battery may have a charge cut-off voltage (oxidation reduction potential) (vs. Li/Li$^{+}$) of greater than or equal to about 4.3V and less than or equal to about 5.0V and specifically, greater than or equal to about 4.5V and less than or equal to about 5.0V.

The rechargeable lithium battery 10 has no particular limit regarding its shape and for example, may have a shape such as a cylinder, a prism, a laminated pouch type, a coin type, and the like.

The positive electrode 20 includes a current collector 21 and a positive active material layer 22.

The current collector 21 may be any conducting material including but not limited to aluminum, stainless steel, nickel-plated steel, and the like.

The positive active material layer 22 includes a positive active material and further includes a conductive material and a binder.

The positive active material may be, for example, a lithium-containing solid-solution oxide, but is not particularly limited as far as a material electrochemically intercalates or deintercalates lithium ions.

In some embodiments, the solid-solution oxide may be at least one of compounds represented by the following Chemical Formulae 1 to 3.

$Li_aMn_xCo_yNi_zO_2$                    Chemical Formula 1

In the above Chemical Formula 1, $1.150 \leq a \leq 1.430$, $0.45 \leq x \leq 0.6$, $0.10 \leq y \leq 0.15$, and $0.20 \leq z \leq 0.28$.

$LiMn_xCo_yNi_zO_2$                    Chemical Formula 2

In the above Chemical Formula 2, $0.3 \leq x \leq 0.85$, $0.10 \leq y \leq 0.3$, and $0.10 \leq z \leq 0.3$.

$LiMn_{1.5}Ni_{0.5}O_4$.                    Chemical Formula 3

The positive active material may be included in an amount of about 85 wt % to about 96 wt % and preferably about 88 wt % to about 94 wt % based on the total amount of the positive active material layer. When the content of the positive active material is included within the range, battery cycle life characteristics and energy density of a positive electrode may be increased. For example, energy density of the positive electrode may be increased up to about 530 Wh/l (180 Wh/kg) or more.

In some embodiments, the positive active material layer 22 may include the protection film-forming material.

The protection film-forming material may form a protection film during charge of a rechargeable lithium battery and specifically, during its first cycle charge. The protection film may pass lithium ions in the electrolyte 43 and simultaneously suppress a solvent therein from passing. The protection film-forming material, that is, the addition of the protection film-forming material, may improve battery cycle life characteristics under a high current density and a high voltage.

The protection film-forming material may be a lithium compound including a lithium ion, an negatively charged core atom, and a cyano group coordinated with the core atom. In other words, the protection film-forming material may be a lithium salt of a lithium ion with an anion complex including a cyano group.

In some embodiments, the core atom may be selected from boron, phosphorus, and carbon.

The protection film-forming material may be specifically at least one of lithium compounds represented by the following Chemical Formulae 4 to 6.

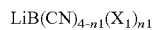  Chemical Formula 4

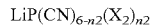  Chemical Formula 5

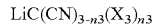  Chemical Formula 6

In the above Chemical Formulae 4 to 6, $n_1$ is an integer ranging from 0 to 3, $n_2$ is an integer ranging from 0 to 5, $n_3$ is an integer ranging from 0 to 2, and $X_1$ to $X_3$ are a ligand except a cyano group, for example, a halogen atom, a substituted or unsubstituted $C_1$-$C_{10}$ alkoxy group, a substituted or unsubstituted $C_1$-$C_4$ fluoroalkyl group, a linear carboxyl group, a sulfonyl group, and the like.

The positive active material has a crystal structure and thus, a plurality of active sites. The protection film-forming material around each active site during the charge provides the active site with electrons from isolated electrons of a nitrogen atom of the cyano group. Accordingly, when the nitrogen atom of the cyano group becomes a cation radical, the protection film-forming material is decomposed.

In addition, the active site may be supplied with one of electrons consisted of the triple bond of the cyano group. The cation radical may not only be adjacent with the active site but also, bonded with cyano groups of other protection film-forming materials. Specifically, the cation radical attacks isolated electrons of the cyano group and may be attached to the cyano group. Accordingly, the protection film-forming materials themselves may be polymerized.

In some embodiments, the cation radical may attack the triple bond of the cyano group. When the other protection film-forming materials have a plurality of cyano groups, nitrogen atoms in free cyano groups may be new cation radicals. Then, the same polymerization reaction is repeated and forms a polymer of the protection film-forming material on an active site, that is, a protection film.

The protection film-forming material is decomposed and polymerized at a lower potential than the decomposition of the solvent in the electrolyte. In other words, the decomposition and polymerization of the protection film-forming material may occur earlier than the decomposition of the solvent. In this way, the protection film may suppress the solvent from being passed.

However, the protection film may include an anion complex and may pass lithium ions, since the lithium ions are inserted among the core atoms of the anion complex.

Accordingly, the protection film may pass the lithium ions in the electrolyte but simultaneously suppress the solvent from be passed. In other words, the protection film promotes the reaction of the active sites with the lithium ions during the charge after two cycles and suppresses another reaction of the active sites with the solvent, that is, decomposition of the solvent. Accordingly, battery cycle life characteristics may be improved.

When the protection film-forming material includes more cyano groups, the protection film-forming material has a more complicated structure and simultaneously forms a protection film having a stable structure. In addition, the protection film-forming material may be hardly dissolved in the solvent and less decomposed on the negative electrode.

Specifically, the $n_1$ and $n_3$ may be 0 in the above Chemical Formulae 4 to 6, and the $n_2$ may be 3 in terms of a stereochemically structure. Since a complex having a phosphorous element as a core atom has a right octahedron structure, the complex having three cyano groups may be stereochemically stable. In addition, when the $n_1$ to $n_3$ have the above value, the cyano groups may be inserted among the core atoms and positioned to be opposite one another and thus stabilize the protection film.

The addition amount of the protection film-forming material may be included in an amount of about 0.1 wt % to about 6 wt % based on the total amount of the positive active material layer, and may be different depending on the composition of the protection film-forming material. When the protection film-forming material is include within the amount range, the protection film-forming material may be suppressed from being eluted into the electrolyte and may form a protection film having an appropriate thickness and thus suppress the solvent from being passed but pass lithium ions.

In some embodiments, when the protection film-forming material is a lithium compound represented by the above Chemical Formula 4, the protection film-forming material may be included in an amount of about 0.5 wt % to about 6 wt %, and preferably about 0.5 wt % to about 4 wt % based on the total amount of the positive active material layer. Specifically, the more cyano groups are included, the more lithium compounds represented by Chemical Formula 1 may be added. When a protection film-forming material has more cyano groups, the less amount of the protection film-forming material may be dissolved in an electrolyte, even though a large amount of the protection film-forming material is included in the positive active material layer.

Specifically, $w_1$ indicating the upper amount limit of a lithium compound represented by the above Chemical Formula 4 is 6, when $n_1$ is 0, and it is smaller, as the $n_1$ is larger. Specifically, when $n_1$ is 1, $w_1$ is 4, when $n_1$ is 2, $w_1$ is 3, and when $n_1$ is 3, $w_1$ is 2. In this way, as the number of cyano groups increases, the more protection film-forming material may be added. As the number of cyano groups increased, the less amount of the protection film-forming material may be dissolved in an electrolyte even though a large amount of the protection film-forming material is added in the positive active material layer.

Specifically, when $n_1$ is 0, the protection film-forming material may be included in an amount of greater than or equal to about 1 wt % and less than or equal to about 5 wt % and specifically, greater than or equal to about 1.5 wt % and less than or equal to about 4 wt %. In addition, when the $n_1$ is 1, the protection film-forming material may be included in an amount of greater than or equal to about 0.7 wt % and less than or equal to about 2 wt %. When the protection film-forming material is included within the range, battery cycle life characteristics may be improved.

In some embodiments, when the protection film-forming material is a lithium compound represented by the above Chemical Formula 5, the protection film-forming material may be included in an amount of about 0.3 wt % to about 2 wt % based on the total amount of the positive active material layer. $w_2$ indicating the upper amount limit of the lithium compound represented by the above Chemical Formula 5 is 3, when $n_2$ is 3, and the larger $|3-n_2|$ is, the smaller the w2 may be. Specifically, when the $|3-n_2|$ is 1, w2 is 2, when $|3-n_2|$ is 2, w2 is 1.5, and when $|3-n_2|$ is 3, $w_2$ may be 1.0. The protection film-forming material may be added in the maximum amount when $n_2$ is 3. The protection film-forming material may be structurally stable, when the number of the cyano group is three.

When the protection film-forming material is a lithium compound represented by Chemical Formula 6, the protection film-forming material may be included in an amount of about 0.5 wt % to about 3 wt % based on the total amount of the positive active material layer. The $w_3$ indicating the upper amount limit of the lithium compound represented by the above Chemical Formula 6 is 3, when $n_3$ is 0, and the smaller the $w_3$ is, the $n_3$ is larger. Specifically, when the $n_3$ is 1, the w3 is 2, while when the $n_3$ is 2, the $w_3$ may be 1.

In this way, when there are more cyano groups, more protection film-forming material may be included. As the number of cyano groups increases, less amount of the protection film-forming material may be dissolved in an electrolyte, even though a large amount of the protection film-forming material is added in a positive active material layer.

The conductive material may include, for example, carbon black such as ketjen black, acetylene black, and the like, natural graphite, artificial graphite, and the like but has no particular limit, as far as any material increases conductivity of a positive electrode.

The content of the conductive material may be about 3 wt % to about 10 wt %, and specifically about 4 wt % to about 6 wt % based on the total amount of the positive active material layer. When the conductive material is included within this range, battery cycle-life characteristics and energy density may be improved.

The binder may include, for example, polyvinylidene fluoride, an ethylene-propylene-diene terpolymer, a styrene-butadiene rubber, an acrylonitrile-butadiene rubber, a fluoro rubber, polyvinyl acetate, polymethylmethacrylate, polyethylene, nitrocellulose, and the like, but has no particular limit and can include any material that binds the positive active material and the conductive material on the current collector 21.

The binder may be included in a range of about 3 wt % to about 7 wt %, and specifically about 4 wt % to about 6 wt % based on total amount of the positive active material layer. When the amount of the binder falls within this range, the battery cycle-life characteristics and energy density may be improved.

The density of the positive active material layer 22 is not particularly limited, but may be in the range of about 2.0 $g/cm^3$ to about 3.0 $g/cm^3$, and specifically in the range of about 2.5 $g/cm^3$ to about 3.0 $g/cm^3$. When the density of the positive active material layer 22 is within the range, the positive active material particles are not destroyed, and thus damage on electrical contact among the particles does not occur, and the battery cycle life and energy density may be increased due to an increased utilization rate of the positive active material.

In some embodiments, the density of the positive active material layer 22 may be obtained by dividing the surface density of the positive active material layer 22 after the compression by the thickness of the positive active material layer 22 after the compression.

The positive active material layer 22 may be manufactured as follow: for example, the positive active material, the conductive material, and the binder are dry-mixed to obtain a mixture, and the mixture and the protection film-forming material are dry-mixed to obtain a dry mixture. Then, the dry mixture is dispersed in an organic solvent to prepare a slurry, and the slurry is applied on a current collector 21, followed by drying and compressing the same. Alternatively, the mixture is dispersed to form slurry, and then the protection film-forming material is dissolved in the slurry. That is to say, a method of adding the protection film-forming material to the positive active material layer is not limited.

In some embodiments, the organic solvent may be capable of dissolving the protection film-forming material. In this case, it may be uniformly dispersed in the positive active material layer. Such an organic solvent may be, for example, N-methyl-2-pyrrolidone, and the like.

The coating method may include any suitable method, for example, a knife coating, a gravure coating, and the like.

In some embodiments, the positive electrode 20 may be manufactured by pressing the positive active material layer 22 using a presser and vacuum-drying the same.

The positive active material layer 22 may be applied on the current collector 21 along with carboxylmethyl cellulose (CMC) as a thickener in an amount of about 1/10 weight or more relative to the total amount of the binder.

The negative electrode 30 includes a current collector 31 and a negative active material layer 32.

The current collector 31 may be any conductor, for example, aluminum, stainless steel, nickel-plated steel, and the like.

The negative active material layer 32 may be any negative active material layer used in a rechargeable lithium battery. For example, the negative active material layer 32 includes a negative active material, and additionally a binder.

The negative active material may be of no particular limit and may be any material that electrochemically intercalates or deintercalates lithium ions. For example, the negative active material may be artificial graphite, natural graphite, a mixture of artificial graphite and natural graphite, natural graphite coated with artificial graphite, silicon, a silicon-containing alloy, silicon oxide, tin, a tin-containing alloy, tin oxide, a mixture of silicon oxide and a graphite material, a mixture of tin oxide and a graphite material, a titanium oxide-based compound such as $Li_4Ti_5O_{12}$, and the like.

The silicon oxide may be represented by $SiO_x$ ($0 \leq x \leq 2$).

The amount of the negative active material may be in the range of about 90 wt % to about 98 wt % based on the total amount of the negative active material layer. When the amount of the negative active material is within the range, the battery cycle life characteristics and energy density may be increased.

In some embodiments, the conductive material may be the same as the conductive material of the positive active material layer.

The amount of the binder including the thickener may be in the range of about 1 wt % to about 10 wt % based on the total amount of the negative active material layer. When the amount of the binder including the thickener is within the range, the battery cycle life and energy density may be increased.

The density of the negative active material layer 32 has no particular limit, but may be, for example, in the range of about 1.0 g/cm$^3$ to about 2.0 g/cm$^3$. When the density of the negative active material layer 32 is within the range, the battery cycle life and energy density may be increased.

The negative active material layer 32 may be formed, for example, by dispersing the negative active material and the binder in a solvent such as N-methyl-2-pyrrolidone, water, and the like to prepare a slurry, and coating the slurry on the current collector 31, followed by drying the same. Subsequently, the negative active material layer 32 may be compressed by using a presser to provide the negative electrode 30.

The density of the negative active material layer 32 may be obtained by dividing the surface density of the negative active material layer 32 after the compression by the thickness of the negative active material layer 32 after the compression.

The separator layer 40a may include a substrate 41 and a porous layer 42 positioned on at least one side of the substrate 41.

The substrate 41 may be composed of a material such as polyethylene, polypropylene and the like, and may include a plurality of first pores 41a.

In FIG. 1, the first pore 41a has a spherical shape, but the first pore may have various shapes without limitation.

In some embodiments, the first pore may have a diameter of about 0.1 μm to about 0.5 μm. The diameter of the first pore may be a diameter when the first pore is considered to be a spherical shape.

The first pore may be measured by, for example, an auto porosimeter (AutoporeIV) (SHIMADZU Corporation, Kyoto, Japan). The measuring device is used, for example, to measure distribution of a diameter distribution of the first pore 41a, and calculate a representative value of the diameter having the highest distribution.

In some embodiments, the diameter of the first pore 41a present in the surface layer of the substrate 41 may be measured using a scanning electron microscope (JSM-6060, JEOL Ltd., Tokyo, Japan). The measuring device may measure the diameter of the first pores 41a, for example, at the surface layer.

In some embodiments, the substrate 41 may have a porosity of about 38 volume % to about 44 volume %. When the porosity of the substrate is within this range, the battery cycle life may be increased. The porosity of the substrate 41 may be obtained by dividing the total volume of the first pore 41a by the total volume of the substrate. The porosity of the substrate 41 may be measured using an auto porosimeter (AutoporeIV) (SHIMADZU Corporation, Kyoto, Japan).

In some embodiments, the substrate 41 may have a thickness in the range of about 6 μm to about 19 μm. When the substrate 41 has a thickness within this range, the cycle-life is improved.

The porous layer 42 may be formed of a material different from the substrate 41, for example, a resin such as polyvinylidene fluoride, polyamideimide, aramid (aromatic polyamide), and the like. The porous layer 42 may include a plurality of the second pores 42a.

The second pores 42a may have a spherical shape as shown in FIG. 1 but may also have various other shapes.

The shape and size of the second pore 42a may be different from the first pore 41a.

Specifically, the diameter and porosity of the second pore 42a may be larger than the first pore 41a. In some embodiments, the second pore 42a may have a diameter of about 1 μm to about 2 μm.

The diameter of the second pore 42a is a diameter when the second pore 42a is considered to have a spherical shape, and may be measured using a scanning electron microscope JSM-6060 (JEOL Ltd., Tokyo, Japan).

Examples of polyvinylidene fluoride used in the porous layer 42 may be KF polymer#1700, #9200, #9300, and the like made by KUREHA Co, Tokyo, Japan.

The polyvinylidene fluoride may have a weight average molecular weight ranging from about 500,000 to about 1,000,000.

The separator 40a may have a porosity ranging from about 39% to about 58%. When the separator 40a has a porosity within this range, the battery cycle life is increased.

Herein, the porosity of the separator 40a may be obtained by dividing the volume sum of the first pores 41a and the second pores 42a by the total volume of the separator 40a, that is, the volume sum of the resin and the first pores 41a of the substrate 41 and the resin and the second pores 42a of the porous layer 42.

The porosity of the separator 40a may be measured using an auto porosimeter (Autopore IV) (SHIMADZU Corporation, Kyoto, Japan).

Because the porosity of the separator 40a is larger than the porosity of the substrate 41, the porosity of the porous layer 42, that is to say, the porosity of the second pore 42a is higher than the porosity of the substrate 41, that is to say, porosity of the first pore 41a.

The thickness of the porous layer 42 may be in the range of about 1 μm to about 5 μm. The thickness of the separator 40a, that is, the thickness sum of the substrate 41 and the porous layer 42, may be in the range of about 10 μm to about 25 μm. When the porous layer 42 and the separator 40a, respectively, have a thickness within the range, cycle-life characteristics may be increased.

The porous layer 42 may be formed on both sides of the substrate 41, that is, the side of the substrate 41 facing the positive electrode 20 and the other side thereof facing the negative electrode 30, but is not limited thereto. Specifically, the porous layer 42 may be positioned on one side of the substrate facing at least the negative electrode 30. The porous layer 42 formed on both sides of the substrate 41 may be preferable in order to increase the battery cycle life characteristics of a rechargeable lithium battery.

The substrate 41 may have air permeation, specifically defined as JIS P8117 standard, ranging from about 250 sec/100 cc to about 300 sec/100 cc but is not limited thereto. The separator 40a may have air permeation ranging from about 220 sec/100 cc to about 340 sec/100 cc but is not limited thereto. When the substrate 41 and the separator 40a respectively have air permeation within the range, the battery cycle life may be increased.

The air permeation of the substrate 41 and the separator 40a may be measured using a GURLEY air permeation meter G-B2 (Toyobesq Co. Ltd., Tokyo, Japan).

The separator 40a may be manufactured as follows.

A resin constituting the porous layer 42 and a water-soluble organic solvent are mixed at a weight ratio of about 5 to 10:about 90 to 95 to prepare a coating liquid. The water-soluble organic solvent may be, for example, N-methyl-2-pyrrolidone, dimethyl acetamide (DMAc), tripropylene glycol (TPG), and the like.

Subsequently, the coating liquid is coated to be in the range of about 1 µm to about 5 µm thick on both sides or one side of the substrate 41. Then, the coated substrate 41 is treated with a coagulation solution to coagulate the resin in the coating solution. Herein, the method of treating the coated substrate 41 with the coagulation solution may be for example, a method of dipping the coated substrate 41 in the coagulation solution or strongly pouring the coagulation solution on the coated substrate. Accordingly, the separator 40a may be manufactured.

In some embodiments, the coagulation solution may be obtained by mixing the water-soluble organic solvent with water.

In some embodiments, the water may be mixed in an amount of about 40 volume % to about 80 volume % based on the total volume of the coagulation solution.

Subsequently, the separator 40a is rinsed with water and dried to remove water and the water-soluble organic solvent from the separator 40a.

In some embodiments, the porous layer 42 may include the above protection film-forming material.

When the protection film-forming material is added to the porous layer, the protection film may be formed at the interface between the porous layer 42 and the positive active material layer 22. Specifically, the protection film-forming material may be added to the porous layer 42 facing the positive electrode 20. The material contacting the positive active material layer of the protection film-forming material dispersed in the porous layer may be decomposed and polymerized during charging, and accordingly forms a protection film at the interface between the porous layer 42 and the positive active material layer 22. That is to say, the protection film-forming material may form a protection film at the interface between the positive active material and the electrolyte solution.

In some embodiments, the protection film may include a polymer formed by polymerization of the protection film-forming material.

In addition, the protection film-forming material may be also added to the porous layer 42 facing the negative electrode.

The protection film-forming material may be included in an amount of about 10 wt % to about 90 wt %, and about 40 wt % to about 90 wt % based on the total amount of the porous layer. When the protection film-forming material is within the range described herein, the amount contacting the positive active material may increases, and the porosity of a porous layer may be easily controlled.

The separator may be formed by applying a coating solution, which may include a resin constituting the porous layer, the protection film-forming material and the water-soluble organic solvent on the substrate 41, solidifying the resin, and the removing the water-soluble organic solvent. The water-soluble organic solvent may dissolve the protection film-forming material.

In some embodiments, both the positive active material layer 22 and the porous layer 42 may include the above protection film-forming material.

When the protection film-forming material is added to the electrolyte or the negative electrode, a protection film is hard to form and, when it is added to the negative electrode, it may decompose on the negative electrode, and accordingly the generated decomposition products may have an unfavorable effect on reactions on the negative electrode.

In some embodiments, the electrolyte 43 may include a lithium salt, a solvent, and an additive.

The lithium salt may be an electrolytic salt of the electrolyte 43.

The lithium salt may include $LiPF_6$, $LiClO_4$, $LiBF_4$, $LiAsF_6$, $LiSbF_6$, $LiSO_3CF_3$, $LiN(SO_2CF_3)_2$, $LiN(SO_2CF_2CF_3)_2$, $LiC(SO_2CF_2CF_3)_3$, $LiC(SO_2CF_3)_3$, $LiI$, $LiCl$, $LiF$, $LiPF5(SO_2CF_3)$, $LiPF_4(SO_2CF_3)_2$, and the like. Among them, $LiPF_6$, $LiClO_4$, $LiBF_4$, $LiAsF_6$, $LiSbF_6$ and the like may be preferable. The lithium salt may be dissolved singularly or as a mixture of two or more.

The lithium salt is dissolved in electrolyte 43, and the battery cycle life of a rechargeable lithium battery may be increased.

The concentration of the lithium salt (a sum of a lithium salt when a plurality of a lithium salt is dissolved in the electrolyte) may be in the range of about 1.15 mol/L to about 1.5 mol/L, and specifically about 1.3 mol/L to about 1.45 mol/L. When the concentration of the lithium salt is within the range, the battery cycle life of a rechargeable lithium battery may be increased.

In some embodiments, the solvent may include fluorinated ether where at least one of hydrogen is substituted with a fluorine atom.

In some embodiments, the fluorinated ether is an ether where hydrogen is substituted with fluorine and may increase oxidation resistance.

Considering the charge voltage of a positive active material and resistance against a current density, examples of the fluorinated ether may include but are not limited to 2,2,2-trifluoroethylmethylether, 2,2,2-trifluoroethyldifluoromethylether, 2,2,3,3,3-pentafluoropropylmethylether, 2,2,3,3,3-pentafluoropropyldifluoromethylether, 2,2,3,3,3-pentafluoropropyl-1,1,2,2-tetrafluoroethylether, 1,1,2,2-tetrafluoro ethylmethylether, 1,1,2,2-tetrafluoroethylethylether, 1,1,2,2-tetrafluoroethylpropylether, 1,1,2,2-tetrafluoroethylbutylether, 1,1,2,2-tetrafluoroethylisobutylether, 1,1,2,2-tetrafluoro ethylisopentylether, 1,1,2,2-tetrafluoroethyl-2,2,2-trifluoroethylether, 1,1,2,2-tetrafluoroethyl-2,2,3,3-tetrafluoropropylether, hexafluoroisopropylmethylether, 1,1,3,3,3-pentafluoro-2-trifluoromethylpropylmethylether, 1,1,2,3,3,3-hexafluoro propylmethylether, 1,1,2,3,3,3-hexafluoropropylethylether, 2,2,3,4,4,4-hexafluorobutyldifluoromethylether, and the like. These may be used singularly or as a mixture of two or more.

The amount of the fluorinated ether may be in the range of about 10 volume % to about 60 volume %, and specifically about 30 volume % to about 50 volume % based on total volume of the solvent. When the amount of the fluorinated ether is within the above range, cycle-life characteristics may furthermore be increased. The fluorinated ether has lower solubility to the protection film-forming material than carbonate ethylene-based organic solvent, and thus elution of the protection film-forming material into electrolyte solution may be suppressed.

In some embodiments, the solvent may further include ethylene monofluorocarbonate.

The ethylene monofluorocarbonate may be included in an amount of about 10 volume % to about 30 volume %, and specifically about 15 volume % to about 20 volume % based on the total volume of the solvent. When the ethylene monofluorocarbonate is included within the above range, cycle-life characteristics may be furthermore improved.

In some embodiments, the solvent may further include a non-aqueous solvent used in a rechargeable lithium battery.

The additive may be a negative-functioning compound, a positive-functioning compound, an ester-based compound, a carbonate ester-based compound, a sulfuric acid ester-based compound, a sulfurous acid ester-based compound, a phosphoric acid ester-based compound, a boric acid ester-based compound, an acid anhydride-based compound, an electrolyte-based compound, and the like. These may be used singularly or as a mixture of two or more.

The negative-functioning compound may be, for example, WCA-1, WCA-2, WCA-3, and the like manufactured by Central Glass Co., Ltd, Tokyo, Japan.

The positive-functioning compound may be, for example, lithium bisfluorosulfonylimide (LiFSI) and the like.

The ester-based compound may be difluoromethyl acetate, diethyl trifluoroacetate, diethyl trifluoroacetate, vinyl acetate, difluoroethyl acetate, 3-sulfolene, and the like.

The carbonate ester-based compound may be vinylene carbonate, vinylethylene carbonate, difluoroethylene carbonate, diallyl carbonate, 2,5-dioxahexane dimethyl acid, 2,5-dioxahexanedioic acid diethyl ester, and the like.

The sulfuric acid ester-based compound or the sulfurous acid ester-based compound may be ethylene sulfite, dimethyl sulfite, dimethyl sulfate, ethylene sulfate, 1,3-propane sultone, 1,4-butane sultone, propene sultone, and the like.

The phosphoric acid ester-based compound may be trimethyl phosphoric acid, trioctyl phosphoric acid, trimethylsilyl phosphoric acid, and the like.

The boric acid ester-based compound may be trimethyl boric acid, trimethylsilyl boric acid, and the like.

The acid anhydride-based compound may be succinic anhydride, allyl succinic anhydride, ethane disulfonic anhydride, and the like.

The electrolyte-based compound may be lithium bis(oxalato-O,O')borate, lithium difluoro(oxalato-O,O')borate, lithium difluorobis(oxalato-O,O')phosphate, and the like.

The amount of the additive may be in the range of about 0.01 wt % to about 5.0 wt % based on the total amount of the electrolyte solution. When the additive is included within the range, cycle-life characteristics may be improved.

The rechargeable lithium battery may be manufactured as follows.

The separator 40a is disposed between the positive electrode 20 and the negative electrode 30 to form an electrode assembly. When the porous layer 42 is formed on only one side of the substrate 41, the negative electrode 30 faces the porous layer 42. Subsequently, the electrode assembly is processed to have a desired shape, for example, a cylinder, a prism, a laminated pouch type, a coin type, and the like and then, inserted into the container. Then, the above electrolyte is injected into the container, so that the pore of the separator 40a may be impregnated with the electrolyte. Accordingly, a rechargeable lithium battery is manufactured.

Hereinafter, the embodiments are illustrated in more detail with reference to examples. These examples, however, should not in any sense be interpreted as limiting the scope of the present invention.

Furthermore, what is omitted in this disclosure may be sufficiently understood by those who have knowledge in this field and will not be illustrated here.

Example 1

Manufacture of Positive Electrode 90 wt % of a solid-solution oxide $Li_{1.20}Mn_{0.55}Co_{0.10}Ni_{0.15}O_2$, 6 wt % of ketjen black, 4 wt % of polyvinylidene fluoride, and 1 part by weight of LiTCB (LiB(CN)$_4$) (based on 100 parts by weight of the solid-solution oxide, the ketjen black and the polyvinylidene fluoride) were dispersed into N-methyl-2-pyrrolidone to prepare a slurry. The slurry was coated and dried on an aluminum current collecting foil to form a positive active material layer. Subsequently, the positive active material layer was compressed to manufacture a positive electrode. Herein, the positive active material layer had a density of 2.3 g/cm$^3$.

Manufacture of Negative Electrode 96 wt % of artificial graphite and 4 wt % of a styrene-butadiene rubber were dispersed into N-methyl-2-pyrrolidone to prepare slurry. The slurry was coated and dried on an aluminum current collecting foil to form a negative active material layer. Subsequently, the negative active material layer was compressed to make a negative electrode. Herein, the negative active material layer had a density of 1.45 g/cm$^3$.

Manufacture of Separator

Aramid (poly[N,N'-(1,3-phenylene)isophthalamide], Sigma-Aldrich Japan K.K.) was mixed with a water-soluble organic solvent in a weight ratio of 5.5:94.5 to prepare a coating liquid. The water-soluble organic solvent was prepared by mixing dimethyl acetamide and tripropylene glycol in a weight ratio of 50:50.

In addition, a porous polyethylene film (a thickness of 13 μm, a porosity of 42 volume %) was used as a substrate.

The coating liquid was coated to be 2 μm thick on both sides of the substrate. Subsequently, the coated substrate was impregnated in a coagulation solution to coagulate a resin in the coating liquid to manufacture a separator. Herein, the coagulation solution was prepared by mixing water, dimethyl acetamide, and tripropylene glycol in a weight ratio of 50:25:25.

Subsequently, the separator was washed with water and dried to remove water and the water-soluble organic solvent.

Preparation of Electrolyte Solution

An electrolyte solution was prepared by mixing monofluoroethylene carbonate (FEC), ethylene carbonate (EC), dimethyl carbonate (DMC), and HCF$_2$CF$_2$OCH$_2$CF$_2$CF$_2$H in a volume ratio of 15:5:45:35 and dissolving lithium hexafluoro phosphate in a concentration of 1.00 mol/L in the mixed solvent.

Manufacture of Rechargeable Lithium Battery Cell

The separator was disposed between the positive and negative electrodes to manufacture an electrode assembly. The electrode assembly was inserted into a test container, and the electrolyte solution was inserted therein to soak each pore of the separator in the electrolyte solution and to manufacture a rechargeable lithium battery cell.

Example 2

A rechargeable lithium battery cell was manufactured according to the same method as Example 1 except for using 1.6 parts by weight of lithium difluoro-O,O'-oxalatoborate based on 100 parts by weight of the solvent to prepare the electrolyte solution.

Comparative Example 1

The rechargeable lithium battery cell was manufactured according to the same method as Example 1 except for using no LiTCB during the manufacture of a positive electrode.

Evaluation 1-1: Cycle-Life Characteristics

The rechargeable lithium battery cells according to Examples 1 and 2 and Comparative Example 1 were charged and discharged, and their cycle-life characteristics were evaluated. The results were provided in the following Table 1 and FIG. 2.

Formation Process: the rechargeable lithium battery cells were constant current charged up to a voltage of 3 V at 0.2 mA/cm$^2$ and allowed to stand for 12 hours. Accordingly, the LiTCB was decomposed and polymerized to form a protection film. Then, the rechargeable lithium battery cells were constant current/constant voltage charged to a voltage of 4.65 V at 0.2 mA/cm$^2$ and constant current discharged to a voltage of 2.00 V at 0.2 mA/cm$^2$ as one charge and discharge cycle.

Cycle Step: the rechargeable lithium battery cells were constant current/constant voltage charged to a voltage of 4.55V at 3 mA/cm$^2$ and constant current discharged to a voltage of 2.40V, and the charge and discharge cycle was 500 times repeated.

Then, a capacity retention was calculated as a percentage by dividing discharge capacity at the 500th cycle by initial discharge capacity at the first cycle.

The tests were all performed at 25° C.

The discharge capacity was measured by using a TOSCAT3000 instrument (Dongyang System Co., Ltd., Tokyo, Japan).

Figure 2:
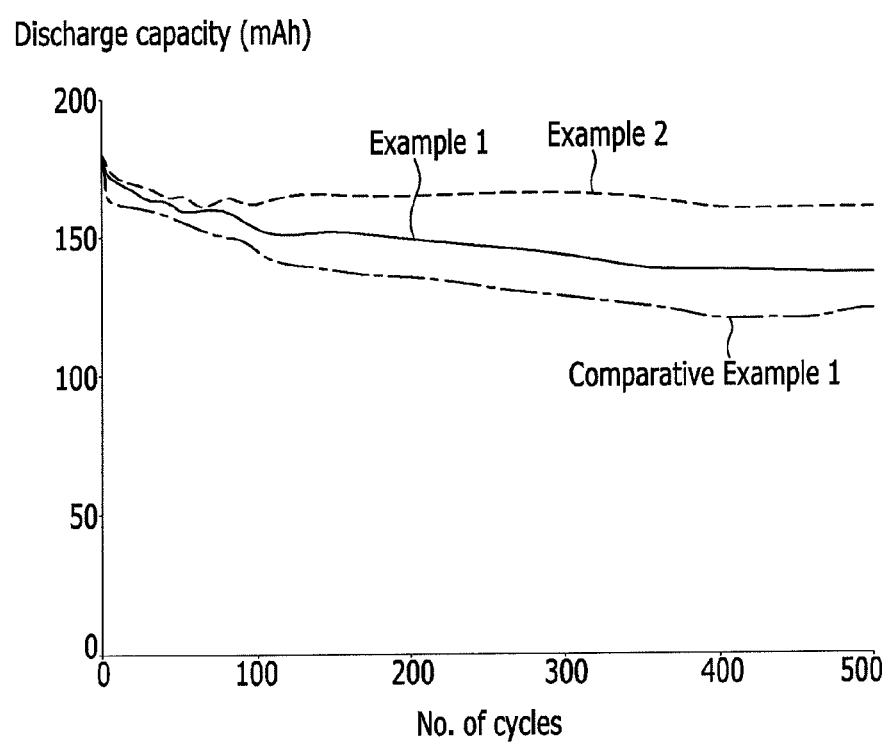
FIG. 2 is a graph showing a relationship between cycle number and discharge capacity of rechargeable lithium battery cells according to Examples 1 and 2 and Comparative Example 1.

FIG. 2 is a graph showing a relationship between the cycle number and discharge capacity of the rechargeable lithium battery cells according to Examples 1 and 2 and Comparative Example 1.

TABLE 1

| | Discharge capacity (mAh) | | Capacity retention (%) |
|---|---|---|---|
| | initial capacity | 500th cycle | |
| Example 1 | 175 | 137 | 78 |
| Example 2 | 175 | 160 | 91 |
| Comparative Example 1 | 175 | 123 | 70 |

Referring to Table 1 and FIG. 2, Example 1 using a protection film showed excellent cycle-life characteristics under high current density and high voltage compared with Comparative Example 1. In addition, Example 2 showed that capacity retention was remarkably increased when an additive was included in the electrolyte solution.

Examples 3 to 21

A rechargeable lithium battery cell was manufactured according to the same method as Example 1 except for using LiTCB in various amounts provided in the following Table 2 to manufacture the positive electrode in Example 1.

In addition, a rechargeable lithium battery cell was manufactured according to the same method as Example 1 except for using LiB(CN)$_3$(OCH$_3$) (LiMCB) in various amounts instead of the LiTCB to manufacture the positive electrode in Example 1.

In addition, another rechargeable lithium battery cell was manufactured according to the same method as Example 1 except for using LiB(CN)$_3$(OCH$_2$CH$_3$) (LiECB) in various amounts provided in the following Table 2 instead of the LiTCB to manufacture the positive electrode in Example 1.

TABLE 2

| | | Protection film-forming material | | |
|---|---|---|---|---|
| | | LiTCB | LiMCB | LiECB |
| Amount | 0.5 parts by weight | Example 3 | Example 10 | Example 16 |
| | 0.7 parts by weight | Example 4 | Example 11 | Example 17 |
| | 1 parts by weight | Example 1 | Example 12 | Example 18 |
| | 1.5 parts by weight | Example 5 | Example 13 | Example 19 |
| | 2 parts by weight | Example 6 | Example 14 | Example 20 |
| | 3 parts by weight | Example 7 | Example 15 | Example 21 |
| | 5 parts by weight | Example 8 | — | — |
| | 6 parts by weight | Example 9 | — | — | a part by weight in Table 2 is a unit based on 100 parts by weight of the total weight of the solid-solution oxide, the ketjen black, and the polyvinylidene fluoride.

Evaluation 1-2: Cycle-Life Characteristics

The capacity retention (%) of the rechargeable lithium battery cells according to Examples 3 to 21 was provided in the following Table 3 and FIGS. 3 and 4 by evaluating the battery cycle life characteristics of the rechargeable lithium battery cells according to Examples 3 to 21 according to the same method as Evaluation 1-1. Herein, the capacity retention (%) was obtained as a percentage of discharge capacity at the 500th cycle relative to initial capacity. The LiTCB, LiMCB, and LiECB all showed initial capacity of 175 mAh.

Figure 3:
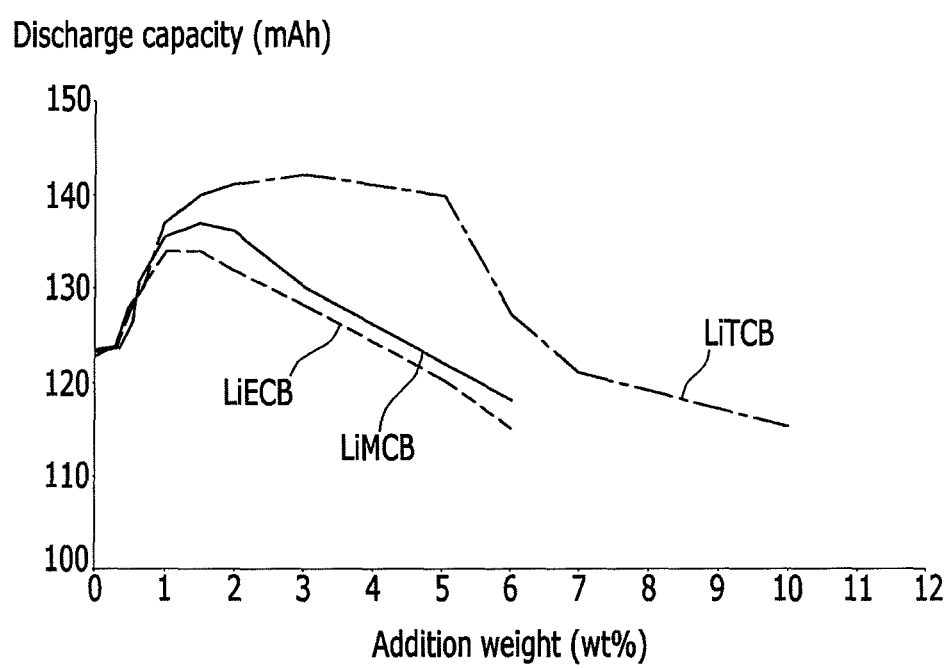
FIG. 3 is a graph showing a relationship between the addition amount of a lithium compound and the discharge capacity of a rechargeable lithium battery cell.
Figure 4:
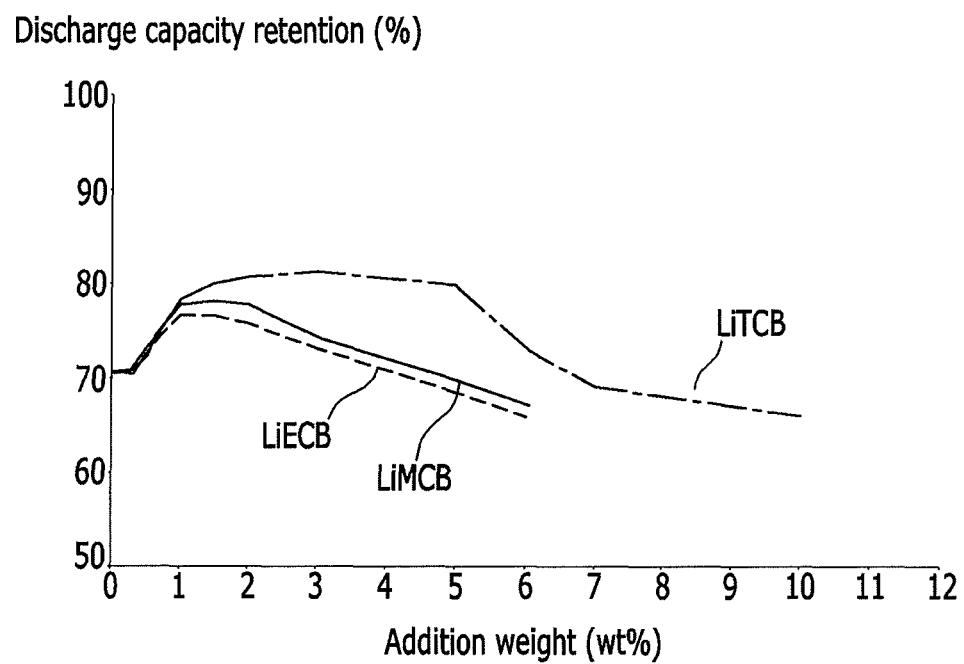
FIG. 4 is a graph showing a relationship between the addition amount of a lithium compound and the discharge capacity retention rate of a rechargeable lithium battery cell.

FIG. 3 is a graph showing the relationship between the amount of a lithium compound added and the discharge capacity of the rechargeable lithium battery cells, and FIG. 4 is a graph showing the relationship between the amount of the lithium compound added and discharge capacity retention of the rechargeable lithium battery cells.

TABLE 3

| | Discharge capacity (mAh) | | Capacity retention (%) |
|---|---|---|---|
| | initial capacity | 500th cycle | |
| Example 1 | 175 | 137 | 78 |
| Example 3 | 175 | 128 | 73 |
| Example 4 | 175 | 130 | 74 |
| Example 5 | 175 | 140 | 80 |
| Example 6 | 175 | 141 | 81 |
| Example 7 | 175 | 142 | 81 |
| Example 8 | 175 | 140 | 80 |
| Example 9 | 175 | 127 | 73 |
| Example 10 | 175 | 127 | 73 |
| Example 11 | 175 | 132 | 75 |
| Example 12 | 175 | 136 | 78 |
| Example 13 | 175 | 137 | 78 |
| Example 14 | 175 | 136 | 78 |
| Example 15 | 175 | 130 | 74 |
| Example 16 | 175 | 127 | 73 |
| Example 17 | 175 | 130 | 74 |
| Example 18 | 175 | 134 | 77 |
| Example 19 | 175 | 134 | 77 |
| Example 20 | 175 | 132 | 75 |
| Example 21 | 175 | 128 | 73 |

Referring to Table 3 and FIGS. 3 and 4, the rechargeable lithium battery cell using LiTCB as a protection film-forming material showed the most increased cycle-life characteristics. The LiTCB had a structure containing a cyano group as all the ligands and thus formed a stable protection film. In addition, the LiTCB might be used in an amount of 0.5 wt % to 6 wt %, and the LiMCB or LiECB might be used in an amount of 0.5 wt % to 4 wt %.

Comparative Example 2

A rechargeable lithium battery cell was manufactured according to the same method as Comparative Example 1 except for using 0.02 mol/l of LiECB to prepare the electrolyte solution instead of those as described in the procedure for Comparative Example 1.

Evaluation 1-3: Cycle-Life Characteristics

The cycle-life characteristics of the rechargeable lithium battery cell according to Comparative Example 2 was evaluated according to the same method as Evaluation 1-1, and the results are provided in the following Table 4.

TABLE 4

|  | Discharge capacity (mAh) | | Capacity |
|  | initial capacity | 500th cycle | retention (%) |
| --- | --- | --- | --- |
| Comparative Example 2 | 160 | 80 | 50 |

Referring to Table 4, the electrolyte solution including a protection film-forming material exhibited deteriorated cycle-life characteristics. The reason is that the protection film-forming material was dissolved in the electrolyte solution and decomposed on the negative electrode and thus hindered reactions on the negative electrode.

On the other hand, when the cyano group of an anion complex is substituted with other ligands such as in compounds like LiECB and LiTCB, LiECB was dissolved in the solvent, but the LiTCB was not almost dissolved therein.

Comparative Example 3

A rechargeable lithium battery cell was manufactured according to the same method as Comparative Example 1 except for using 0.5 parts by weight of LiTCB (100 parts by weight of the artificial graphite and the styrene-butadiene rubber) to manufacture the negative electrode as described in the procedure of in Comparative Example 1.

Evaluation 1-4: Cycle-Life Characteristics

The cycle-life characteristics of the rechargeable lithium battery cell according to Comparative Example 3 were evaluated according to the same method as Evaluation 1-1, and the results are provided in the following Table 5.

TABLE 5

|  | Discharge capacity (mAh) | | Capacity |
|  | initial capacity | 500th cycle | retention (%) |
| --- | --- | --- | --- |
| Comparative Example 3 | 159 | 0 | 0 |

Referring to Table 5, when the negative active material layer included a protection film-forming material, cycle-life characteristics were deteriorated. The reason is that the protection film-forming material decomposed on the negative electrode and hindered the reaction thereon.

Example 22

A rechargeable lithium battery cell was manufactured according to the same method as Example 1 except for using no LiTCB to manufacture the positive electrode and adding polyvinylidene fluoride and LiTCB in a weight ratio of 40:60 to prepare a coating liquid for a separator in Example 1.

Comparative Example 4

The rechargeable lithium battery cell was manufactured according to the same method as Comparative Example 1 except for adding polyvinylidene fluoride and $Al_2O_3$ in a weight ratio of 40:60 to prepare a coating liquid for a separator as described in the procedures of Comparative Example 1.

Evaluation 1-5: Cycle-Life Characteristics

The cycle-life characteristics of the rechargeable lithium battery cells according to Example 22 and Comparative Example 4 were evaluated according to the same method as Evaluation 1-1, and the results are provided in the following Table 6.

TABLE 6

|  | Discharge capacity (mAh) | | Capacity |
|  | initial capacity | 500th cycle | retention (%) |
| --- | --- | --- | --- |
| Example 22 | 175 | 130 | 74 |
| Comparative Example 4 | 175 | 123 | 70 |

Referring to Table 6, even when a protection film-forming material was included in a porous layer, the battery cycle-life characteristics were increased by a protection film.

Examples 23 to 26

A rechargeable lithium battery cell was manufactured according to the same method as Example 1 except for adding $LiPF_3(CN)_3$ in various amounts provided in the following Table 7 instead of the LiTCB to manufacture a positive electrode and lithium hexafluoro phosphate in a concentration of 1.2 mol/L to prepare the electrolyte solution as described in the procedures of Example 1.

Evaluation 1-6: Cycle-Life Characteristics

The cycle-life characteristics of the rechargeable lithium battery cells according to Examples 23 to 26 were evaluated according to the same method as Evaluation 1-1, and the results are provided in the following Table 7 and FIG. 5.

Figure 5:
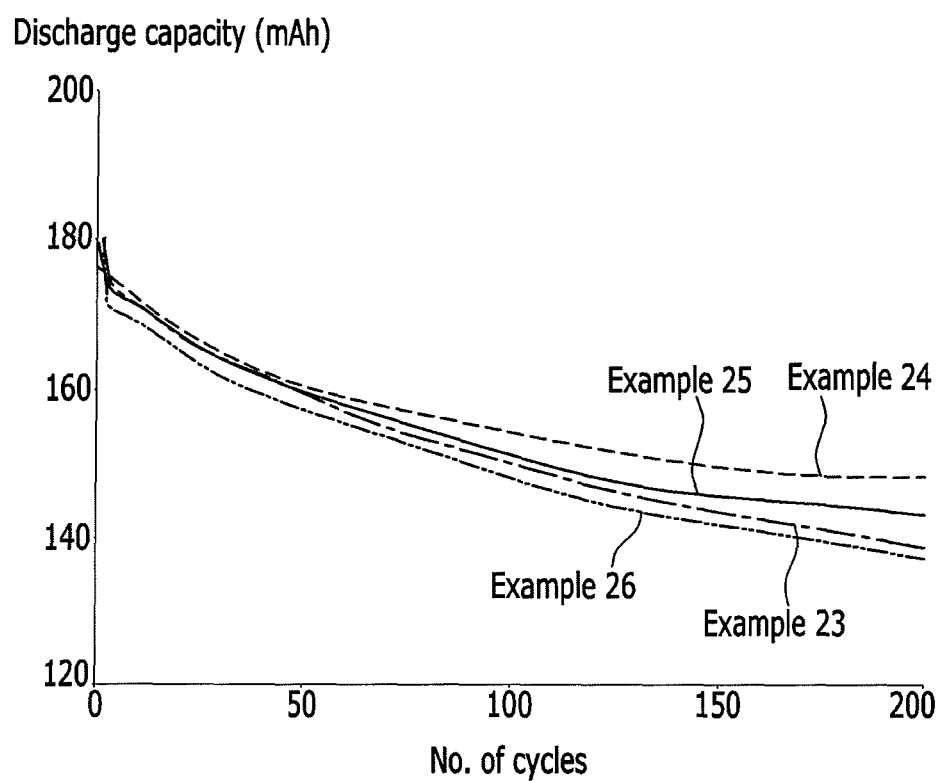
FIG. 5 is a graph showing a relationship between cycle number and discharge capacity of rechargeable lithium battery cells according to Examples 23 to 26 and Comparative Example 5.

FIG. 5 is a graph showing the relationship between the cycle number and the discharge capacity of the rechargeable lithium battery cells according to Examples 23 to 26.

TABLE 7

| | Amount of LiPF$_3$(CN)$_3$ (parts by weight) | Discharge capacity (mAh) | | Capacity retention (%) |
|---|---|---|---|---|
| | | initial capacity | 500th cycle | |
| Example 23 | 0.3 | 180 | 139 | 77 |
| Example 24 | 0.7 | 180 | 148 | 82 |
| Example 25 | 1.0 | 178 | 143 | 80 |
| Example 26 | 3.0 | 177 | 137 | 77 |

A part by weight in Table 7 is used based on 100 parts by weight of the total weight of the solid-solution oxide, ketjen black, and polyvinylidene fluoride.

Referring to Table 7 and FIG. 5, LiPF$_3$(CN)$_3$ as the protection film-forming material decomposed and polymerized, forming a protection film, and this protection film increased cycle-life characteristics under high current density and high voltage.

Examples 27 to 29

A rechargeable lithium battery cell was manufactured according to the same method as Example 1 except for substituting LiC(CN)$_4$ in various amounts provided in the following Table 8 instead of the LiTCB to manufacture the positive electrode and lithium hexafluoro phosphate in a concentration of 1.2 mol/L to prepare the electrolyte solution in Example 1.

Evaluation 1-7: Cycle-Life Characteristics

The cycle-life characteristics of the rechargeable lithium battery cells according to Examples 27 to 29 were evaluated according to the same method as Evaluation 1-1, and the results are provided in the following Table 8 and FIG. 6.

Figure 6:
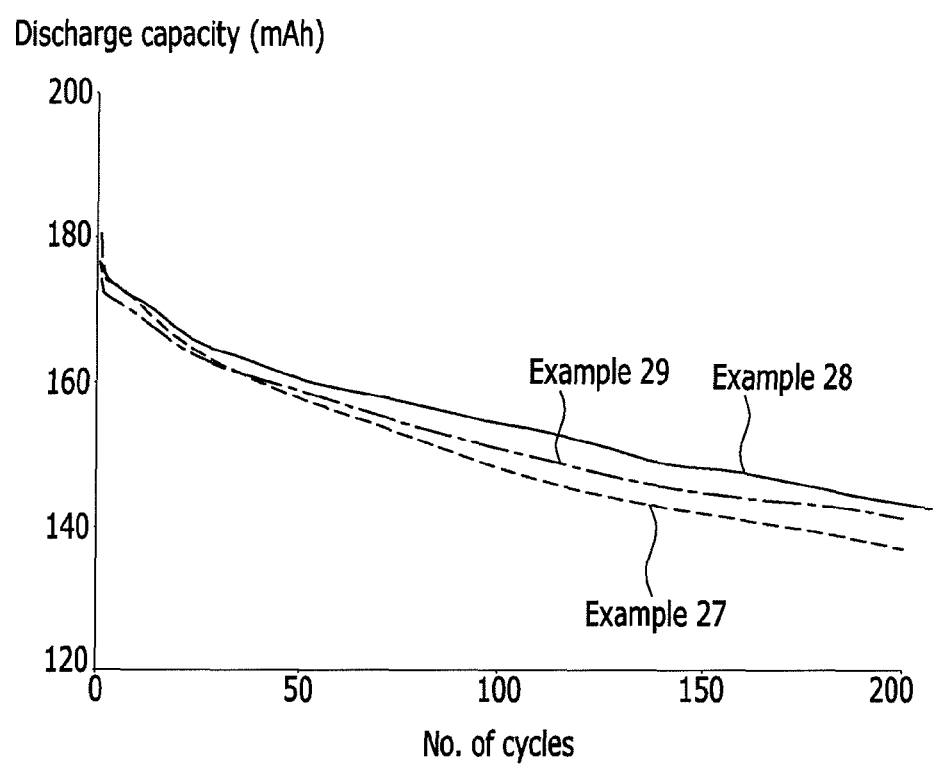
FIG. 6 is a graph showing a relationship between cycle number and discharge capacity of rechargeable lithium battery cells according to Examples 27 to 29 and Comparative Example 6.

FIG. 6 is a graph showing the relationship between cycle number and discharge capacity of the rechargeable lithium battery cells according to Examples 27 to 29.

TABLE 8

| | Amount of LiC(CN)$_3$ (parts by weight) | Discharge capacity (mAh) | | Capacity retention (%) |
|---|---|---|---|---|
| | | initial capacity | 500th cycle | |
| Example 27 | 0.5 | 180 | 137 | 76.1 |
| Example 28 | 1.0 | 180 | 143 | 79 |
| Example 29 | 3.0 | 176 | 141 | 80 |

Referring to Table 8 and FIG. 6, the LiC(CN)$_3$ as a protection film-forming material was decomposed and polymerized to from a protection film, and the protection film increased cycle-life characteristics under a high current density and high voltage.

Examples 30 to 34

A rechargeable lithium battery cell was manufactured according to the same method as Example 1 except for using LiB(CN)$_2$(OCH$_3$)$_2$ in various amounts provided in the following Table 9 instead of the LiTCB to manufacture the positive electrode as described in the procedures of Example 1.

In addition, a rechargeable lithium battery cell was manufactured according to the same method as Example 1 except for using LiBCN(OCH$_3$)$_3$ in various amounts provided in the following Table 9 instead of the LiTCB to manufacture the positive electrode as described in the procedures of Example 1.

TABLE 9

| | | Protection film-forming material | |
|---|---|---|---|
| | | LiB(CN)$_2$(OCH$_3$)$_2$ | LiBCN(OCH$_3$)$_3$ |
| Amount | 0.5 parts by weight | Example 30 | Example 33 |
| | 0.7 parts by weight | Example 31 | Example 34 |
| | 1 parts by weight | Example 32 | — |

Evaluation 1-8: Cycle-Life Characteristics

The cycle-life characteristics of the rechargeable lithium battery cells according to Examples 30 to 34 were evaluated according to the same method as Evaluation 1-1, and the results are provided in the following Table 10.

TABLE 10

| | Discharge capacity (mAh) | | Capacity retention (%) |
|---|---|---|---|
| | initial capacity | 500th cycle | |
| Example 30 | 180 | 141 | 78 |
| Example 31 | 180 | 140 | 78 |
| Example 32 | 180 | 135 | 75 |
| Example 33 | 180 | 139 | 77 |
| Example 34 | 180 | 138 | 77 |

Referring to Table 10, the LiB(CN)$_2$(OCH$_3$)$_2$ and LiBCN(OCH$_3$)$_3$ as a protection film-forming material decomposed and polymerized to form a protection film, and this protection film increased the cycle-life characteristics under a high current density and a high voltage.

Examples 35 to 47

A rechargeable lithium battery cell was manufactured according to the same method as Example 1 except for using LiPF$_2$(CN)$_4$ in various amounts provided in the following Table 11 instead of the LiTCB to manufacture the positive electrode as described in the procedures of Example 1.

In addition, a rechargeable lithium battery cell was manufactured according to the same method as Example 1 except for using LiPF(CN)$_5$ in various amounts provided in the following Table 11 instead of the LiTCB to manufacture the positive electrode as described in the procedures of Example 1.

Furthermore, a rechargeable lithium battery cell was manufactured according to the same method as Example 1 except for using LiP(CN)$_6$ in various amounts provided in the following Table 11 instead of the LiTCB to manufacture the positive electrode as described in the procedures of Example 1.

TABLE 11

| | | Protection film-forming material | | |
|---|---|---|---|---|
| | | LiPF$_2$(CN)$_4$ | LiPF(CN)$_5$ | LiP(CN)$_6$ |
| Amount | 0.3 parts by weight | Example 35 | — | — |
| | 0.5 parts by weight | Example 36 | Example 41 | Example 45 |
| | 0.7 parts by weight | Example 37 | Example 42 | Example 46 |

TABLE 11-continued

| | Protection film-forming material | | |
|---|---|---|---|
| | $LiPF_2(CN)_4$ | $LiPF(CN)_5$ | $LiP(CN)_6$ |
| 1 part by weight | Example 38 | Example 43 | Example 47 |
| 1.5 parts by weight | Example 39 | Example 44 | — |
| 2 parts by weight | Example 40 | — | — |

Evaluation 1-9: Cycle-Life Characteristics

The cycle-life characteristics of the rechargeable lithium battery cells according to Examples 35 to 47 were evaluated according to the same method as Evaluation 1-1, and the results are provided in the following Table 12.

TABLE 12

| | Discharge capacity (mAh) | | |
|---|---|---|---|
| | initial capacity | 500th cycle | Capacity retention (%) |
| Example 35 | 180 | 141 | 78 |
| Example 36 | 180 | 148 | 82 |
| Example 37 | 180 | 149 | 83 |
| Example 38 | 180 | 153 | 85 |
| Example 39 | 180 | 144 | 80 |
| Example 40 | 180 | 137 | 77 |
| Example 41 | 180 | 151 | 84 |
| Example 42 | 180 | 157 | 87 |
| Example 43 | 180 | 160 | 89 |
| Example 44 | 180 | 149 | 83 |
| Example 45 | 180 | 151 | 84 |
| Example 46 | 180 | 166 | 92 |
| Example 47 | 180 | 157 | 87 |

Referring to Table 12, the $LiPF_2(CN)_4$, $LiPF(CN)_5$, and $LiP(CN)_6$ as a protection film-forming material decomposed and polymerized to form a protection film, and this protection film increased cycle-life characteristics under a high current density and a high voltage.

Examples 48 to 53

A rechargeable lithium battery cell was manufactured according to the same method as Example 1 except for using $LiC(CN)_2OCH_3$ in various amounts as provided in the following Table 13 instead of the LiTCB to manufacture the positive electrode as described in the procedures of Example 1.

In addition, a rechargeable lithium battery cell was manufactured according to the same method as Example 1 except for using $LiCCN(OCH_3)_2$ in various amounts as provided in the following Table 13 instead of the LiTCB to manufacture the positive electrode as described in the procedures of Example 1.

TABLE 13

| | | Protection film-forming material | |
|---|---|---|---|
| | | $LiC(CN)_2OCH_3$ | $LiCCN(OCH_3)_2$ |
| Amount | 0.5 parts by weight | Example 48 | Example 52 |
| | 0.7 parts by weight | Example 49 | — |
| | 1 parts by weight | Example 50 | Example 53 |
| | 1.5 parts by weight | Example 51 | — |

Evaluation 1-10: Cycle-Life Characteristics

The cycle-life characteristics of the rechargeable lithium battery cells according to Examples 48 to 53 were evaluated using the same method as Evaluation 1-1, and the results are provided in the following Table 14.

TABLE 14

| | Discharge capacity (mAh) | | |
|---|---|---|---|
| | initial capacity | 500th cycle | Capacity retention (%) |
| Example 48 | 180 | 148 | 82 |
| Example 49 | 180 | 142 | 79 |
| Example 50 | 180 | 140 | 78 |
| Example 51 | 180 | 140 | 78 |
| Example 52 | 180 | 145 | 81 |
| Example 53 | 180 | 141 | 78 |

Referring to Table 14, $LiC(CN)_2OCH_3$ and $LiCCN(OCH_3)_2$ as a protection film-forming material decomposed and were polymerized to form a protection film, and this protection film increased the cycle-life characteristics under a high current density and a high voltage.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable lithium battery, comprising
a positive electrode comprising a current collector and positive active material layer disposed on the current collector and including a positive active material;
wherein the positive active material comprises at least one solid-solution oxide of compounds represented by the following Chemical Formulae 1 to 3:

$Li_aMn_xCo_yNi_zO_2$  Chemical Formula 1 wherein, $1.150 \leq a \leq 1.430$, $0.45 \leq x \leq 0.6$, $0.10 \leq y \leq 0.15$, and $0.20 \leq z \leq 0.28$, $LiMn_xCo_yNi_zO_2$  Chemical Formula 2 wherein, $0.3 \leq x \leq 0.85$, $0.10 \leq y \leq 0.3$, and $0.10 \leq z \leq 0.3$, $LiMn_{1.5}Ni_{0.5}O_4$;  Chemical Formula 3 a negative electrode;
a separator including a substrate and a porous layer positioned on at least one side of the substrate; and
an electrolyte solution,
wherein at least one of the positive active material layer and the porous layer comprises at least one protection film forming material of lithium compounds represented by the following Chemical Formulae 5 or 6:

$LiP(CN)_{6-n2}(X_2)_{n2}$  Chemical Formula 5

$LiC(CN)_{3-n3}(X_3)_{n3}$  Chemical Formula 6 wherein,
$n_2$ is an integer ranging from 0 to 5,
$n_3$ is an integer ranging from 0 to 2, and
$X_2$ and $X_3$ are independently selected from a halogen atom, a substituted or unsubstituted $C_1$-$C_{10}$ alkoxy group, a substituted or unsubstituted $C_1$-$C_4$ fluoroalkyl group, a linear carboxyl group, and a sulfonyl group.

2. The rechargeable lithium battery of claim 1, wherein the protection film-forming material is a material that forms a protection film at an interface between the positive active material layer and the porous layer.

3. The rechargeable lithium battery of claim 1, wherein the protection film-forming material is a material that forms a protection film at an interface between the positive active material and the electrolyte solution.

4. The rechargeable lithium battery of claim 2, wherein the protection film comprises a polymer formed by polymerization of the protection film-forming material.

5. The rechargeable lithium battery of claim 3, wherein the protection film comprises a polymer formed by polymerization of the protection film-forming material.

6. The rechargeable lithium battery of claim 1, wherein when the positive active material layer comprises the protection film-forming material, the amount of the protection film-forming material is in the range of about 0.1 wt % to about 6 wt % based on the total amount of the positive active material layer.

7. The rechargeable lithium battery of claim 6, wherein when the protection film-forming material is a lithium compound represented by the above Chemical Formula 5, $$\text{LiP(CN)}_{6-n2}(X_2)_{n2} \quad \text{Chemical Formula 5:}$$

the amount of the protection film-forming material is in the range of about 0.3 wt % to about 2 wt % based on the total amount of the positive active material layer, and when the protection film-forming material is a lithium compound represented by the above Chemical Formula 6, $$\text{LiC(CN)}_{3-n3}(X_3)_{n3} \quad \text{Chemical Formula 6:}$$

the amount of protection film-forming material is in the range of about 0.5 wt % to about 3 wt % based on the total amount of the positive active material layer.

8. The rechargeable lithium battery of claim 1, wherein when the porous layer comprises the protection film-forming material, the amount of the protection film-forming material is in the range of about 10 wt % to about 90 wt % based on the total amount of the porous layer.

9. The rechargeable lithium battery of claim 1, wherein the electrolyte solution comprises a lithium salt, solvent and an additive, and the additive comprises a negative-functioning compound, a positive-functioning compound, an ester-based compound, a carbonate ester-based compound, a sulfuric acid ester-based compound, a phosphoric acid ester-based compound, a boric acid ester-based compound, an acid anhydride-based compound, or a combination thereof.

* * * * *